United States Patent
Cobb

(10) Patent No.: US 12,343,930 B1
(45) Date of Patent: Jul. 1, 2025

(54) SOLID-STATE ADDITIVE MANUFACTURING SYSTEM AND METHOD

(71) Applicant: United States of America as represented by the Administrator of NASA, Washington, DC (US)

(72) Inventor: Josef Benjamin Cobb, Huntsville, AL (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 245 days.

(21) Appl. No.: 18/352,060

(22) Filed: Jul. 13, 2023

(51) Int. Cl.
*B33Y 10/00* (2015.01)
*B29C 64/118* (2017.01)
*B29C 64/209* (2017.01)
*B33Y 30/00* (2015.01)

(52) U.S. Cl.
CPC .......... *B29C 64/118* (2017.08); *B29C 64/209* (2017.08); *B33Y 10/00* (2014.12); *B33Y 30/00* (2014.12)

(58) Field of Classification Search
None
See application file for complete search history.

(56) References Cited

U.S. PATENT DOCUMENTS

| | | | |
|---|---|---|---|
| 6,543,671 B2 | 4/2003 | Hatten et al. | |
| 6,638,381 B2 | 10/2003 | Keener et al. | |
| 9,782,811 B2 | 10/2017 | Sung et al. | |
| 11,484,967 B2 | 11/2022 | Eller et al. | |
| 2006/0289603 A1 | 12/2006 | Zettler et al. | |
| 2012/0006086 A1 | 1/2012 | Manchiraju et al. | |
| 2015/0059426 A1 | 3/2015 | Sung et al. | |
| 2015/0165546 A1 | 6/2015 | Kandasamy et al. | |
| 2016/0175981 A1 | 6/2016 | Kandasamy | |
| 2020/0047279 A1 | 2/2020 | Misak | |
| 2020/0198046 A1* | 6/2020 | Imaizumi | B33Y 10/00 |

FOREIGN PATENT DOCUMENTS

CN 112958902 A * 2/2021

* cited by examiner

*Primary Examiner* — Yung-Sheng M Tsui
(74) *Attorney, Agent, or Firm* — Jerry L. Seemann; Trenton J. Roche

(57) ABSTRACT

Additive manufacturing systems and methods are disclosed. A housing includes a passageway and an inverted trough that is in fluid communication with the passageway and that is open along two faces of the housing. A pin is at least partially disposed in the housing with its circumferential face being adjacent to the passageway such that a volumetric region lies between the inverted trough and the circumferential face of the pin. The pin is operable to be rotated such that material fed through the passageway is plasticized in the volumetric region. With the first face of the housing adjacent to a substrate as the pin is rotated and the material is fed through the passageway, the plasticized material is deposited onto the substrate as shaped by the inverted trough.

19 Claims, 7 Drawing Sheets

SOLID-STATE ADDITIVE MANUFACTURING SYSTEM AND METHOD

ORIGIN OF THE INVENTION

The invention described herein was made by an employee of the United States Government and may be manufactured and used by or for the Government of the United States of America for governmental purposes without the payment of any royalties thereon or therefore.

BACKGROUND OF THE INVENTION

1. Field of the Invention

This disclosure relates to additive manufacturing. More specifically, the disclosure presents additive manufacturing systems and methods using a rotating pin disposed in a non-rotating housing.

2. Description of the Related Art

Many structures must be stiff in order to meet performance criteria. When fabricating stiffened structures, ribs are frequently included as the primary stiffening attribute. Unfortunately, incorporating stiffening ribs in some structures is complex, time-consuming, and costly. For example, rib-stiffened barrel walls are currently made using thick plates of material. The plates are first processed to have iso-grids machined from them. The plates are then bump formed to the right diameter to form barrel sections that are subsequently welded together.

SUMMARY OF THE INVENTION

Accordingly, it is an object of the present disclosure to describe methods and systems for improving the fabrication of structures.

Another object of the present disclosure is to describe methods and systems for improving the fabrication of stiffened structures.

Other objects and advantages of the methods and systems described herein will become more obvious hereinafter in the specification and drawings.

In accordance with the present disclosure, an additive manufacturing system includes a housing configured to include a passageway extending through a portion of the housing. The passageway has a first open end at an exterior of the housing and a second open end at an interior of the housing. The first open end is adapted to receive a material that is to be fed through the passageway and exit the second open end. The housing is further configured to include an inverted trough open along a first face of the housing. The inverted trough has a side adjacent to and in fluid communication with the second open end of the passageway. The inverted trough extends to a shaped opening at a second face of the housing that is perpendicular to the first face. The system also includes a pin having a longitudinal axis, a circumferential face, and an axial tip. The pin is at least partially disposed in the housing with its circumferential face being adjacent to the second open end of the passageway and with its axial tip disposed parallel to the first face of the housing such that a volumetric region lies between the inverted trough and the circumferential face of the pin. The pin is operable to be rotated about its longitudinal axis such that, when the pin is rotated and the material exits the second open end, the material exiting he second open end is plasticized in the volumetric region. The material so-plasticized exits the inverted trough at the shaped opening as the material is fed through the passageway.

In accordance with the present disclosure, the additive manufacturing system may be used in an additive manufacturing process that includes positioning the housing adjacent to a substrate so that the first face of the housing opposes a face of the substrate. The pin is then rotated about its longitudinal axis. The material is fed through the passageway from the first open end during the step of rotating so that the material exits the second open end and is plasticized in the volumetric region. Relative movement is generated between the housing and the substrate during the steps of rotating and feeding so that the material so-plasticized in the volumetric region exits the inverted trough at the shaped opening and is deposited on the face of the substrate as the material is fed through the passageway.

BRIEF DESCRIPTION OF THE DRAWING(S)

Other objects, features and advantages of the methods and systems described herein will become apparent upon reference to the following description of the preferred embodiments and to the drawings, wherein corresponding reference characters indicate corresponding parts throughout the several views of the drawings and wherein.

DESCRIPTION OF THE PREFERRED EMBODIMENT(S)

Figure 1:
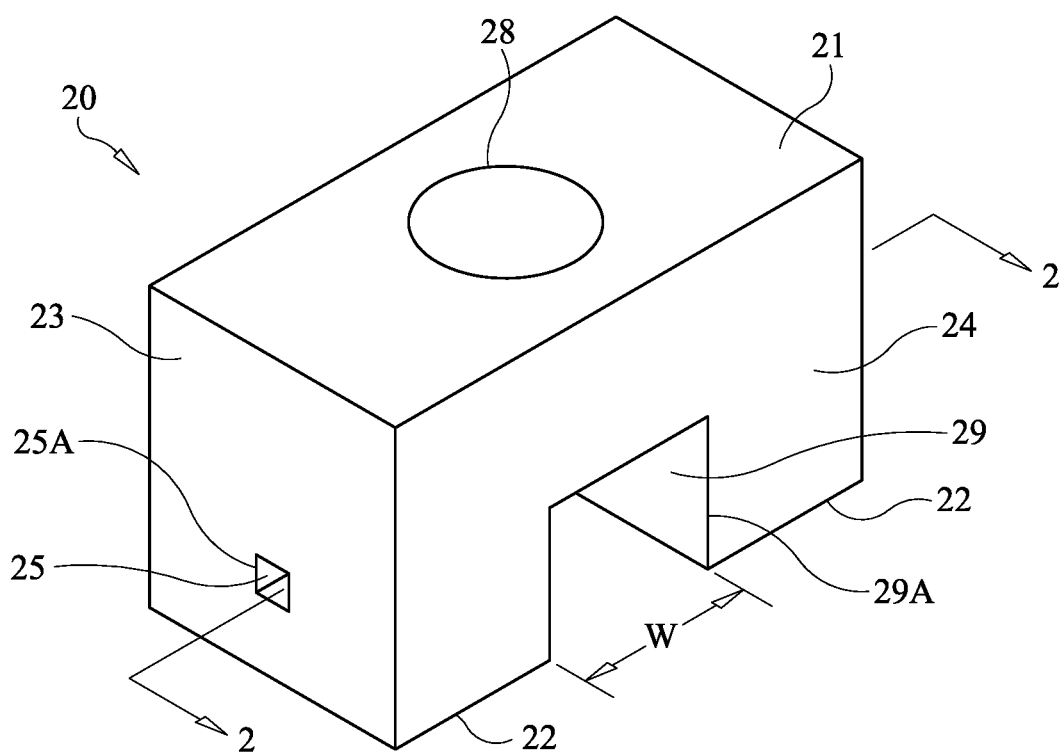
FIG. 1 is an isolated perspective view of one embodiment of a deposition control housing for use in an additive manufacturing system in accordance with various aspects as described herein.
Figure 2:
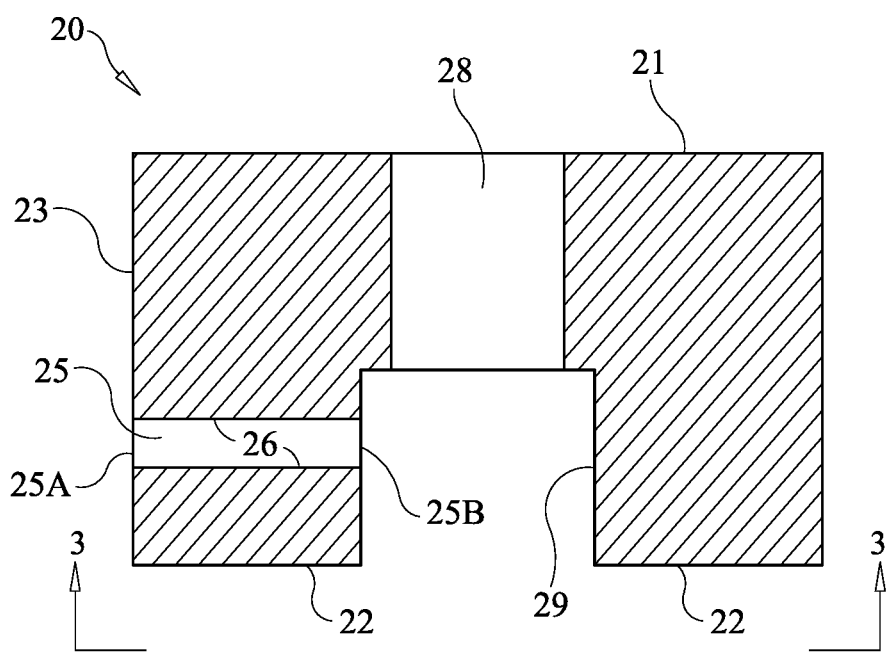
FIG. 2 is an isolated cross-sectional view of the deposition control housing taken along line 2-2 in FIG. 1 in accordance with various aspects as described herein.
Figure 3:
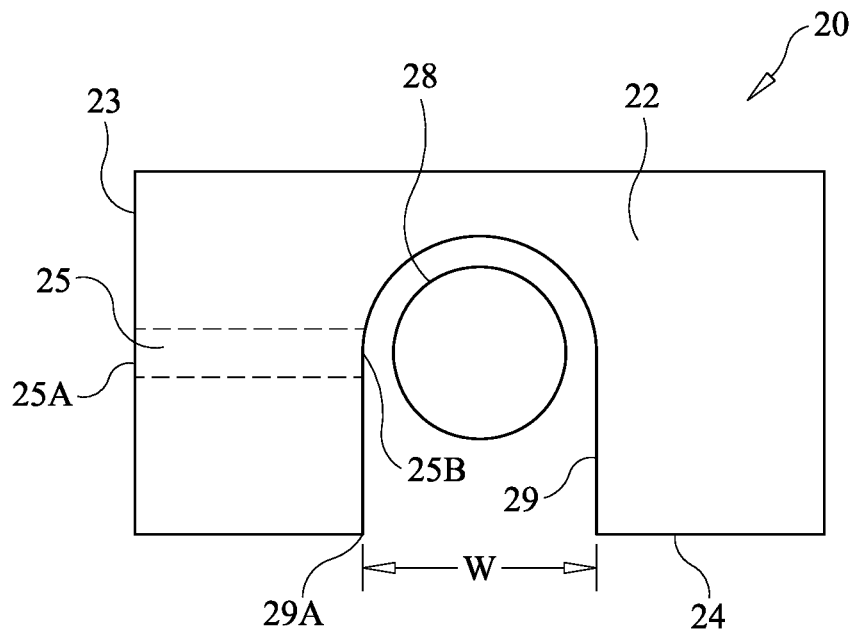
FIG. 3 is an isolated bottom view of the deposition control housing taken along line 3-3 in FIG. 2 in accordance with various aspects as described herein.
Figure 4:
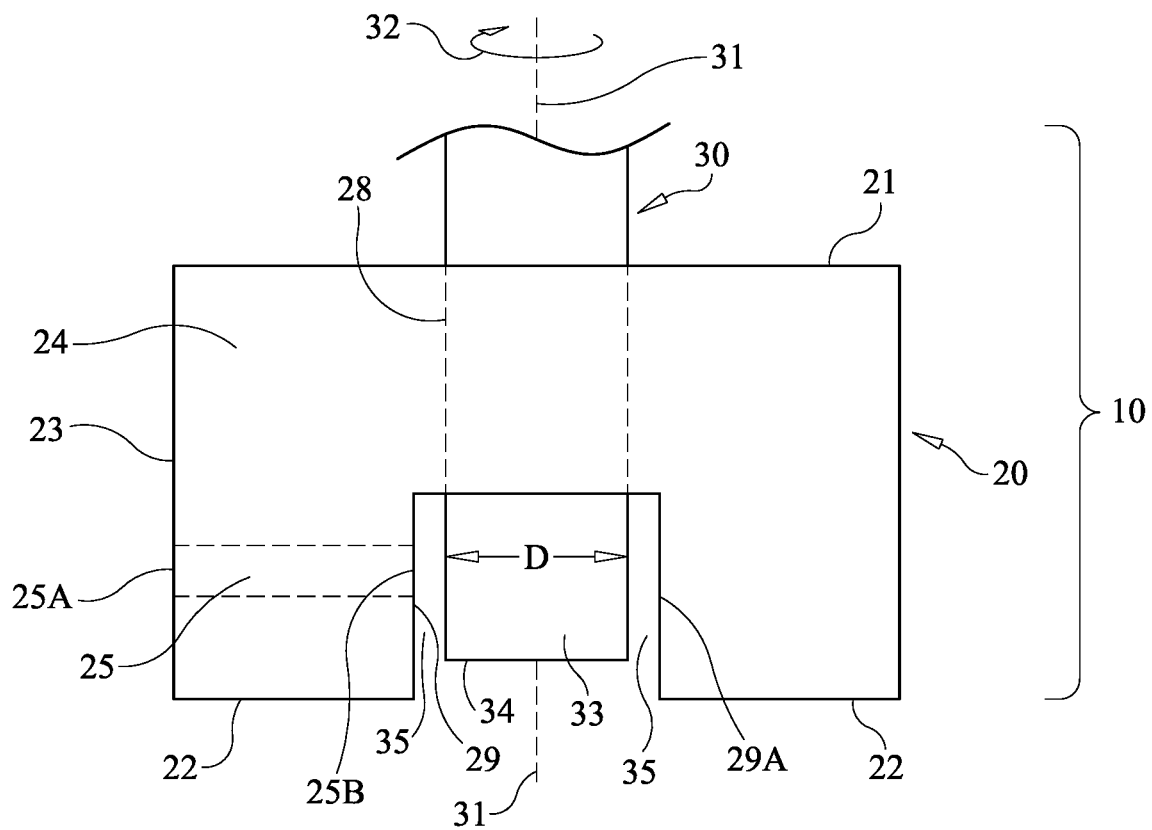
FIG. 4 is a head-on view of one embodiment of an additive manufacturing system in accordance with various aspects as described herein.
Figure 5:
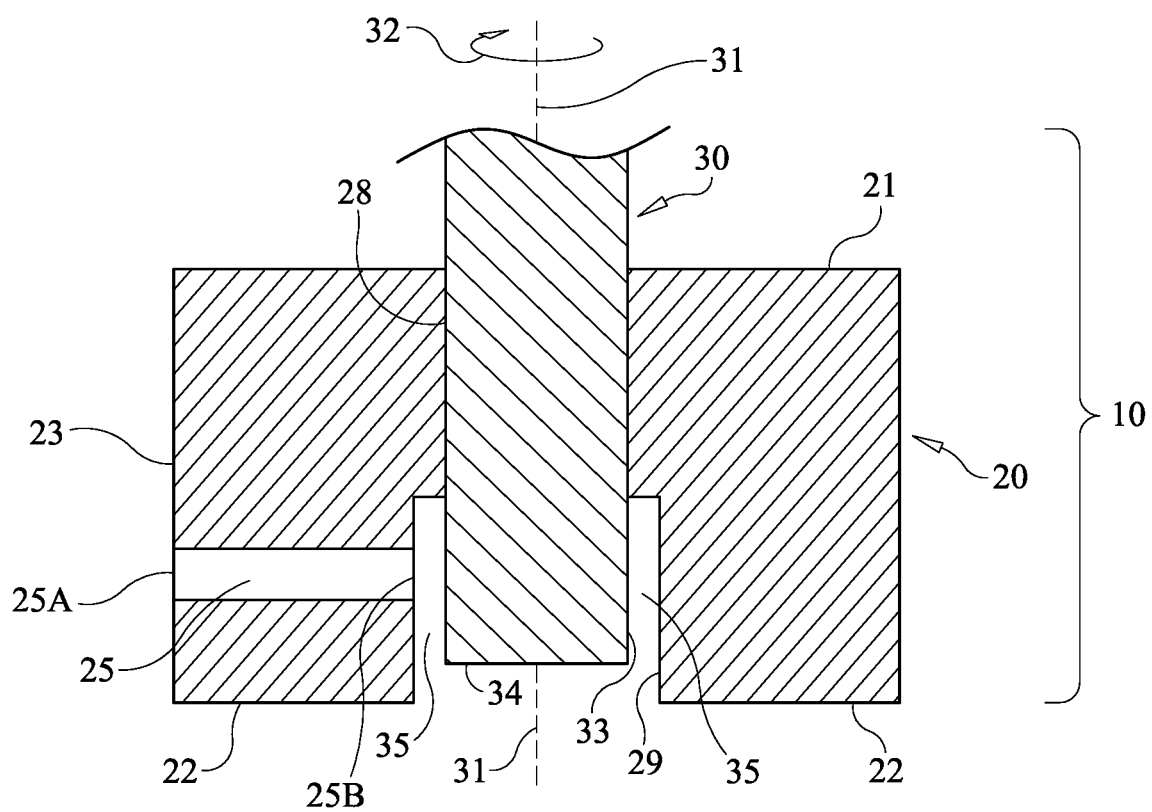
FIG. 5 is a cross-sectional view of the additive manufacturing system of FIG. 4 in accordance with various aspects as described herein.

Referring now to the drawings, simultaneous reference will be made to FIGS. 1-5 where an embodiment of an additive manufacturing system in accordance with the present disclosure is illustrated in FIGS. 4-5, and where the system's deposition control housing is illustrated in various isolation views in FIGS. 1-3. The additive manufacturing system illustrated in FIGS. 4-5 is referenced generally by numeral 10. As will be explained later herein, system 10 may be used to construct and/or modify structures through an additive manufacturing process that deposits additional/new material onto an existing structure or portion thereof that will hereinafter be referred to simply as a substrate. The substrate as well as the additional/new material may be metals such as, but not limited to aluminum alloys, titanium alloys, steel, or any material that lends itself to solid-state joining techniques (e.g., friction stir welding (FSW), computer numeric controlled (CNC) machinery, etc.). The substrate may be a wall (e.g., part of a barrel, dome, or other large structure) that may or may not require the inclusion of stiffening features (e.g., ribs) where the ultimate fabricated structure may be used, for example, in the construction of aeronautical vehicles, aerospace vehicles, ship hulls, pressure vessels, etc. The substrate may be a portion of a wall that is being added to in order to increase the size of the wall or may be a baseplate upon which a wall is being built. Thus, the systems and methods described herein may be used to construct and/or modify a variety of sized/shaped structures without departing from the scope of the present disclosure.

System 10 includes a deposition control housing 20 (shown in various isolated views in FIGS. 1-3) and a cylindrical pin 30 (shown in the views of system 10 in FIGS. 4-5). Pin 30 may be part of a FSW tool used for conventional FSW processes. In such cases, it is to be understood that a motorized/mechanized system (not shown) may be coupled to pin 30 in order to rotate pin 30 about its longitudinal axis 31 within non-rotating housing 20 as indicated by rotation arrow 32.

Housing 20 is a rigid structure that may be constructed using one or more pieces without departing from the scope of the present disclosure. Housing 20 includes a top face 21, a bottom face 22, a side face 23, and a trailing edge face 24 that is perpendicular to bottom face 22. Housing 20 is configured to include a tubular passageway or tunnel 25 extending through a portion of housing 20. More specifically, passageway 25 has a first open end 25A and a second open end 25B where first open end 25A is accessible at side face 23 and second open end 25B is disposed at an interior portion of housing 20 as will be explained further below. The diametric cross-sectional shape of passageway 25 including the diametric cross-sectional shapes of open ends 25A and 25B may be circular, rectangular, oval, etc., without departing from the scope of the present disclosure. In the illustrated embodiment, passageway 25 is a linear passageway. In some embodiments, the walls 26 of passageway 25 may be coated or otherwise processed to provide a reduced friction surface for reasons to be described later herein. In some embodiments, the cross-sectional area of open end 25B is larger than the cross-sectional area of open end 25A for reasons to be described later herein.

Housing 20 is further configured to include a bore 28 extending from top face 21 to an inverted trough 29 defined in housing 20. Inverted trough 29 is open along bottom face 22 and at a shaped opening 29A at trailing edge face 24. In the illustrated example, shaped opening 29A matches the cross-sectional size/shape of inverted trough 29 in the area thereof adjacent to pin 30. However, and as will be explained later herein, shaped opening 29A may be sized/shaped differently than the cross-sectional size/shape of inverted trough 29 in the area thereof adjacent to pin 30. A side of inverted trough 29 is in fluid communication with open end 25B as will be explained further below. Bore 28 is configured to receive pin 30 therein such that housing 20 supports rotation of pin 30 about its longitudinal axis 31 as indicated by rotation arrow 32. Bore 28 may be configured to include features (not shown) that support rotation 32. For example, such features may include, but are not limited to, bearings positioned in/along bore 28, friction-reducing coatings or treatments along bore 28, etc.

Pin 30 has a circumferential face 33 and an exposed axial tip 34 disposed in inverted trough 29. More specifically, pin 30 is disposed in inverted trough 29 such that circumferential face 33 is adjacent to and spaced apart from open end 25B of passageway 25. That is, the diameter "D" of pin 30 is less than the width "W" of inverted trough 29 in the area thereof adjacent to pin 30. As a result, a volumetric region 35 is defined in housing 20 between inverted trough 29 and circumferential face 33 of pin 30. In some embodiments and as shown, the shape of volumetric region is semi-cylindrical as dictated by the shape of inverted trough 29 where it opposed circumferential face 33. However, it is to be understood that the shape/size of volumetric region 35 may be other than as shown without departing from the scope of the present disclosure. In addition, axial tip 34 is disposed parallel to bottom face 22. For example, depending on the application, axial tip 34 may be disposed slightly above or below bottom face 22. In some embodiments, passageway 25 is a linear passageway that is perpendicular to longitudinal axis 31 of pin 30.

Figure 6:
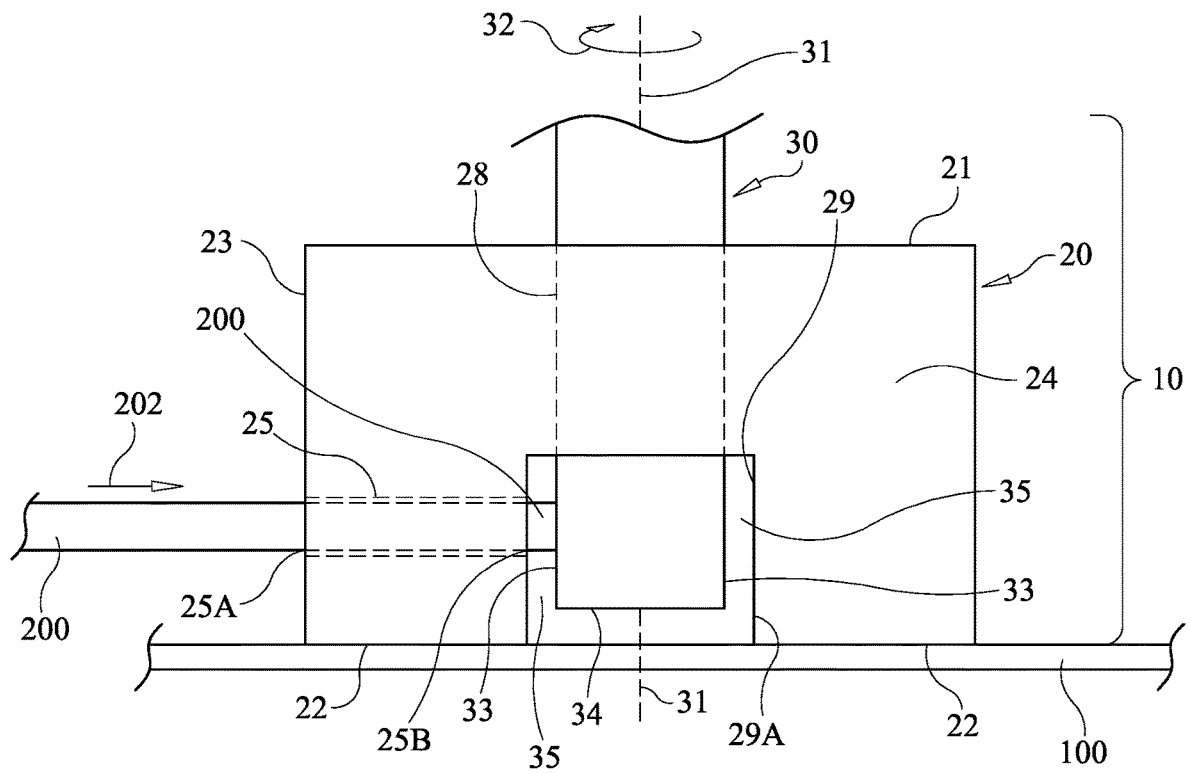
FIG. 6 is a head-on view of one embodiment of an additive manufacturing system disposed on the face of a substrate as the system is being fed with a material that is to be deposited on the face of the substrate in accordance with various aspects as described herein.
Figure 7:
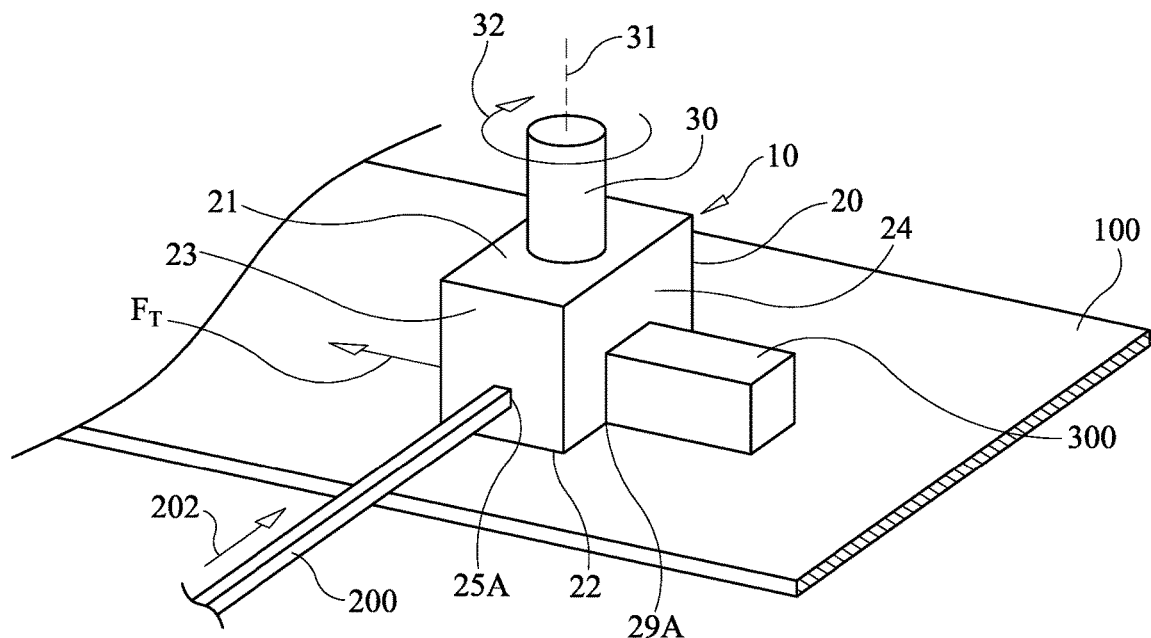
FIG. 7 is a perspective of the additive manufacturing system illustrated in FIG. 6 as it is disposed on and translated along the face of a substrate as the system is being fed with a material that is to be deposited on the face of the substrate in accordance with various aspects as described herein.

With additional reference now to FIGS. 6-7, an additive manufacturing method using the above-described system 10 will be described. As shown in FIG. 6, system 10 is positioned with bottom face 22 of housing 20 on the surface of a solid substrate 100 (e.g., an existing wall structure). Next and as shown in FIG. 7, motive forces are applied to system 10 as a material 200 is fed into and through passageway 25. More specifically, pin 30 may be driven to rotation 32 by a motorized mechanism/system (not shown) as the same or different mechanism/system applies a translation force "FT" (FIG. 7) to system 10. In some embodiments, the translation force Fr may be applied to substrate 100. Accordingly, it is to be understood that the method described herein only requires relative translation movement between system 10 and substrate 100.

The additive processing is achieved by feeding material 200 into and through housing 20 using the above-described passageway 25. More specifically, material 200 is fed into the passageway's open end 25A and is pushed along the passageway as indicated by arrow 202 so that material 200 exits open end 25B and enters volumetric region 35 in inverted trough 29. In some embodiments, material 200 may be a solid bar, rod, wire, etc. In some embodiments, material 200 may be a powder, or metal chips derived from scrap metal, that is supplied to passageway 25 under pressure. In some embodiments, substrate 100 and material 200 are the same material. In some embodiments, substrate 100 and material 200 are different materials. In all cases, material 200 exits open end 25B and enters volumetric region 35 where material 200 is plasticized by rotating pin 30. During translation of housing 20 as pin 30 is rotated, the plasticized material 200 exits housing 20 at shaped opening 29A at trailing edge face 24 such that the plasticized material 200 is deposited onto the surface of substrate 100 as a rib 300 (FIG. 7). The size/shape of shaped opening 29A dictates the size/shape of rib 300 as system 10 has the above-described rotation and translation forces applied thereto.

Figure 8:
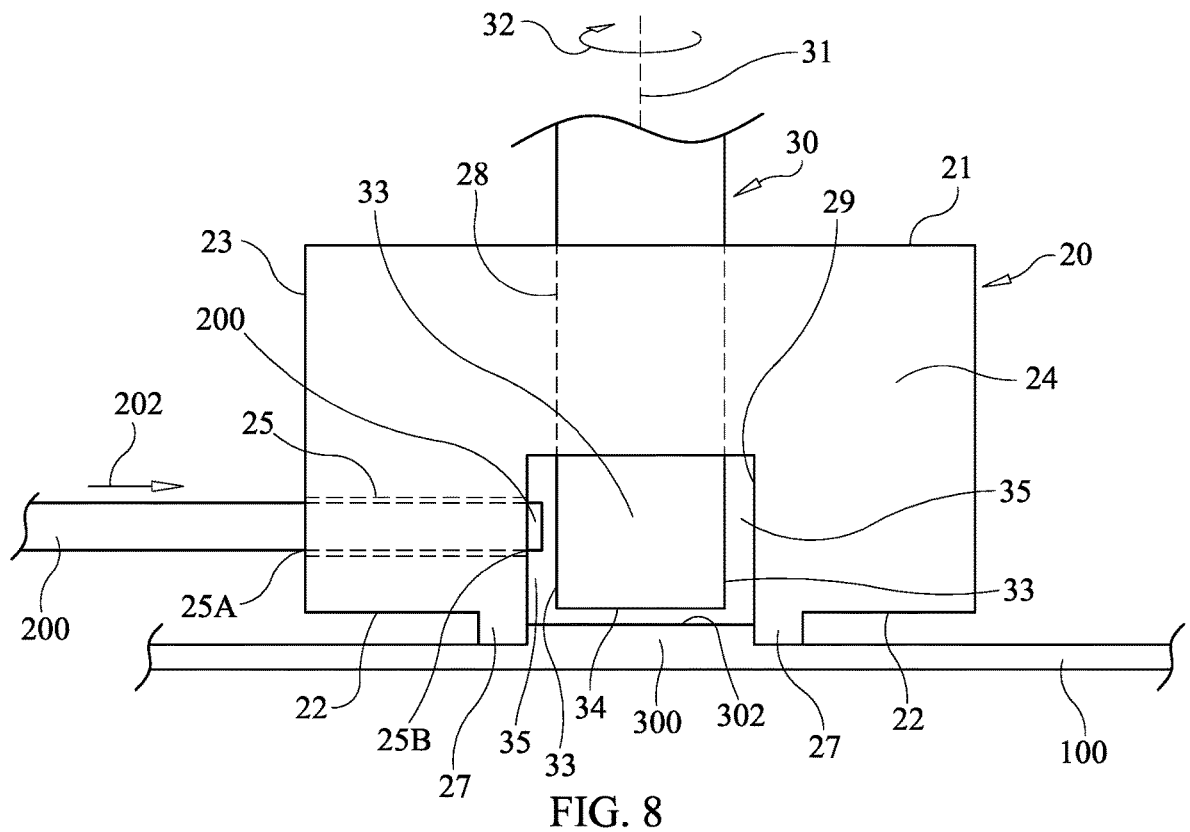
FIG. 8 is a head-on view of another embodiment of an additive manufacturing system disposed on the edge region of a rib and as the system is being fed with a material that is to be deposited on the rib in accordance with various aspects as described herein.

In some wall or other structure building applications, the height of rib 300 may need to be greater than what can be fabricated using a single pass of system 10. To accommodate such applications, the above-described deposition control housing 20 may be modified to facilitate additional passes of the system to increase the build-up on an existing rib. For example and with reference now to FIGS. 8-9, the above-described housing 20 may be modified to include guides 27 at the housing's bottom face 22. More specifically, guides 27 are disposed along bottom face 22 and are parallel to one another when disposed at opposing parallel sides of inverted trough 29. Guides 27 may be integral parts of the housing at bottom face 22 or may be attached to bottom face 22 without departing from the scope of the present disclosure. The spacing between guides 27 is equal to the width W of inverted trough 29. Accordingly, guides 27 and inverted trough 29 are configured to fit over an existing rib 300 with guides 27 sealed up against the sides of an existing rib 300 with the top face 302 of rib 300 disposed adjacent to or in contact with axial tip 34 of pin 30 in inverted trough 29.

Figure 9:
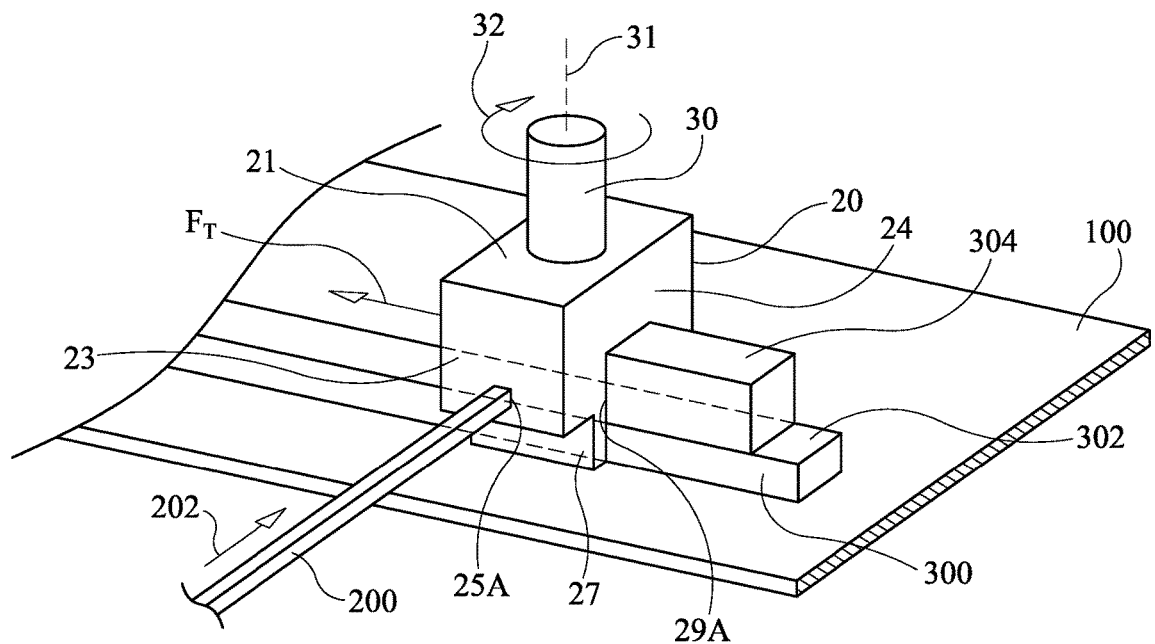
FIG. 9 is a perspective of the additive manufacturing system illustrated in FIG. 8 as it is disposed on and translated along the rib as the system is being fed with a material that is to be deposited on the rib in accordance with various aspects as described herein.

Referring additionally to FIG. 9, motive forces are applied to the system positioned on existing rib 300 and material 200 is fed into housing 20 as explained above. More specifically, pin 30 is driven to rotation 32 by a motorized mechanism/system (not shown) as the same or different mechanism/system applies a translation force Fr to the system. As pin 30 rotates, the top face 302 of existing rib 300 is plasticized. The plasticization of top face 302 may be achieved by axial tip 34 being in contact with rib 300 or slightly spaced apart therefrom such that the pin's rotation is still capable of influencing plasticization of top face 302. The additive processing is achieved by feeding a material 200 into and through housing 20 using the above-described passageway 25. More specifically, material 200 is fed into the passageway's open end 25A and is pushed along the passageway as indicated by arrow 202 so that material 200 exits open end 25B and enters volumetric region 35 in inverted trough 29 as explained previously herein. As material 200 exits open end 25B and enters volumetric region 35 where it is plasticized by rotating pin 30, the plasticized material 200 mixes with the plasticized top face 302 of existing rib 300. The resulting mixture is deposited onto existing rib 300 as additional rib 304 as the system has the above-described rotation and translation forces applied thereto. The size/shape of inverted trough 29 dictates the size/shaped of additional rib 304.

Figure 10:
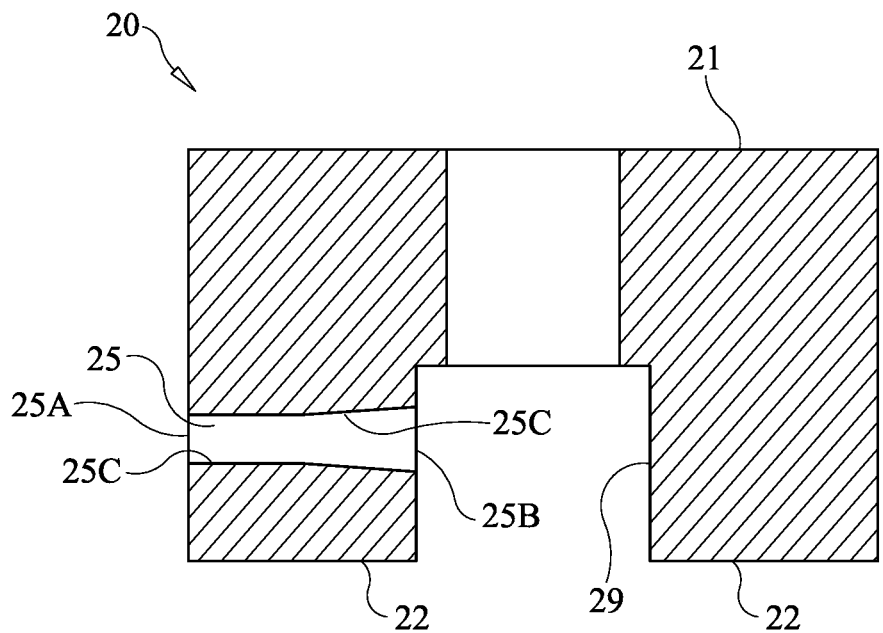
FIG. 10 is an isolated cross-sectional view of another embodiment of a deposition control housing for use in an additive manufacturing system in accordance with various aspects as described herein.

To avoid clogs in the system's housing during the additive manufacturing process, one or more of the features mentioned previously herein may be included. For example and as mentioned above, open end 25B of passageway 25 may be encompassed by the open side of inverted trough 29 that is in fluid communication with open end 25B to reduce the chance that material 200 will bind or clog when entering volumetric region 35. For similar reasons, the walls 26 (FIG. 2) of passageway 25 and/or any surface within housing 20 may be coated, treated, or configured for ultrasonic excitation, etc., for reduced friction with material 200 as it is fed into/through passageway 25 and as plasticized materials are processed in volumetric region 35. For similar reasons, the cross-sectional area of open end 25B of passageway 25 may be larger than the cross-sectional area of open end 25A. For example and as illustrated in FIG. 10, passageway 25 may include a flared region 25C that terminates in open end 25B such that open end 25B has a larger cross-sectional area than that of open end 25A. The length and angular flare of flared region 25C are not limitations of the methods and systems described herein. In some embodiments, it may also be desirable to coat, treat, etc., exterior portions of housing 20 that will come into contact with a substrate/rib with anti-friction coatings/treatments to facilitate the above-described relative translational movement between the housing and the substrate/rib.

Figure 11:
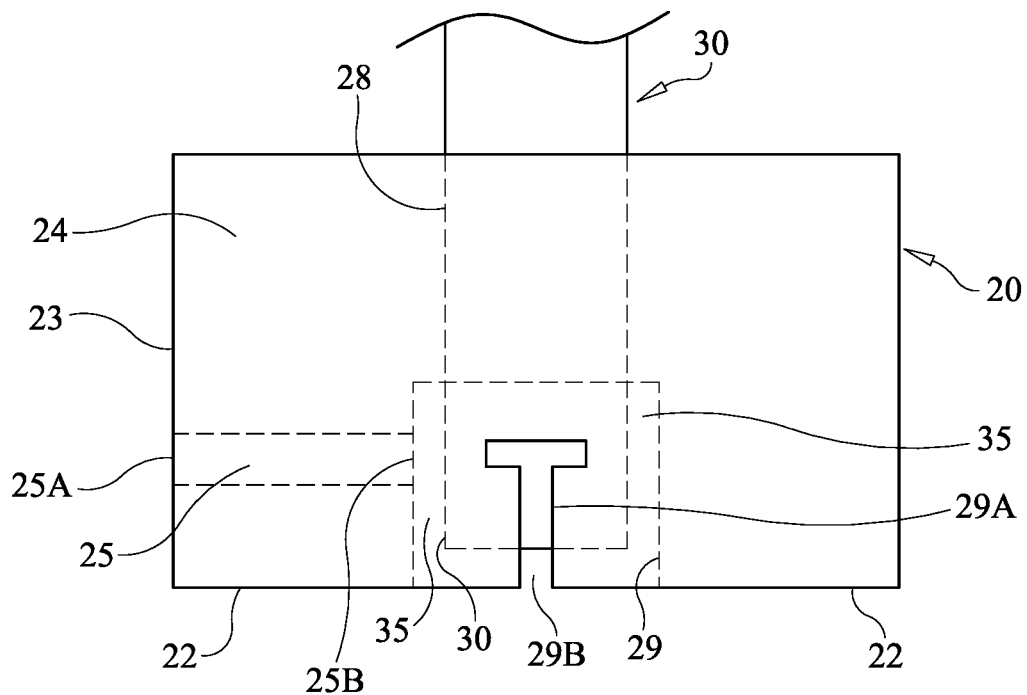
FIG. 11 is a head-on view of another embodiment of an additive manufacturing system in accordance with various aspects as described herein.
Figure 12:
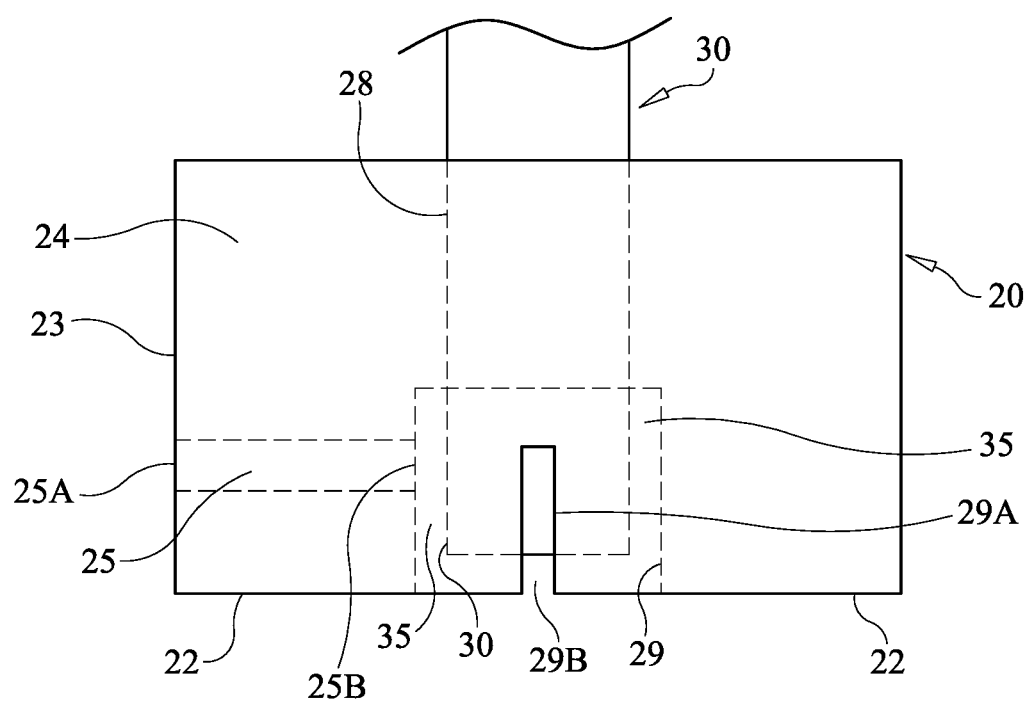
FIG. 12 is a head-on view of another embodiment of an additive manufacturing system in accordance with various aspects as described herein.

As mentioned above, the size/shape of shaped opening 29A at trailing edge face 24 may be different than the cross-sectional size/shape of inverted trough 29 in the area thereof adjacent to pin 30. Two such examples of different size/shaped openings 29A are illustrated in FIGS. 11 and 12. In FIG. 11, shaped opening 29A at trailing edge face 24 is "T" shaped. In FIG. 12, shaped opening 29A at trailing edge face 24 is narrower than the width of inverted trough 29 in the area thereof adjacent to pin 30. In both cases, the opening of inverted trough 29 at bottom face 22 will match the bottom 29B of shaped opening 29A at the interface of bottom face 22 and trailing edge face 24.

The advantages of the systems and methods described herein are numerous. Existing solid-state joining machines such as FSW or CNC machines may be readily leveraged to construct an additive manufacturing system that may be operated to construct and/or modify walled structures. The system incorporates modularity so it can be attached to the end of an existing FSW or CNC machine thereby readying the system for additive manufacturing processes with minimal time and expense. The system is adaptable to the fabrication of large walled and/or rib-stiffened structures used in the construction of aeronautical and aerospace vehicles, ship or underwater vessel hulls, pressure vessels, etc. If needed, the system is readily adapted for water cooling to reduce tool wear, adapt to materials having higher melt temperatures, etc.

Although the methods and systems presented herein have been described for specific embodiments thereof, there are numerous variations and modifications that will be readily apparent to those skilled in the art in light of the above teachings. For example, in some embodiments, the system's housing may be modified to utilize a portion of an existing structure to aid in containing the plasticized added material prior to its deposition onto the existing structure. It is therefore to be understood that, within the scope of the appended claims, the methods and systems presented herein may be practiced other than as specifically described.

What is claimed as new and desired to be secured by Letters Patent of the United States is:

1. An additive manufacturing system, comprising:
    a housing configured to include a passageway extending through a portion of said housing, said passageway having a first open end at an exterior of said housing and a second open end at an interior of said housing, said first open end adapted to receive a material that is to be fed through said passageway and exit said second open end, said housing further configured to include an inverted trough open along a first face of said housing, said inverted trough having a side adjacent to and in fluid communication with said second open end, said inverted trough extending to a shaped opening at a second face of said housing that is perpendicular to said first face; and a pin having a longitudinal axis, a circumferential face, and an axial tip, said pin at least partially disposed in said housing with said circumferential face being adjacent to said second open end of said passageway and with said axial tip disposed parallel to said first face of said housing, wherein a volumetric region lies between said inverted trough and said circumferential face of said pin, and said pin being operable to be rotated about said longitudinal axis wherein, when said pin is rotated and the material exits said second open end, the material exiting said second open end is plasticized in said volumetric region, and wherein the material so-plasticized exits said inverted trough at said shaped opening as the material is fed through said passageway.

2. The additive manufacturing system of claim 1, wherein said passageway is linear.

3. The additive manufacturing system of claim 1, wherein said passageway is linear and is perpendicular to said longitudinal axis of said pin.

4. The additive manufacturing system of claim 1, further comprising guides coupled to said first face of said housing at opposing sides of said inverted trough, said guides adapted to receive and seal against opposing sides of an edge region of a substrate, wherein the edge region is disposed in said inverted trough in opposition to said axial tip of said pin wherein the edge region is plasticized as said pin is rotated, and wherein the material so-plasticized mixes with the edge region so-plasticized as the material is fed through said passageway.

5. The additive manufacturing system of claim 1, wherein a cross-sectional area of said second open end is larger than a cross-sectional area of said first open end.

6. The additive manufacturing system of claim 1, wherein a cross-section of said second open end is encompassed by said side of said inverted trough in fluid communication with said second open end.

7. The additive manufacturing system of claim 1, wherein said shaped opening matches a cross-sectional shape of said inverted trough.

8. An additive manufacturing system, comprising:
a housing configured to include a linear tunnel extending through a portion of said housing, said linear tunnel having a first open end at an exterior of said housing and a second open end at an interior of said housing, said first open end adapted to receive a material that is to be fed through said linear tunnel and exit said second open end, said housing further configured to include an inverted trough open along a first face of said housing, said inverted trough having a side adjacent to and in fluid communication with said second open end wherein a cross-section of said second open end is encompassed by said side of said inverted trough in fluid communication with said second open end, said inverted trough extending to a shaped opening at a second face of said housing that is perpendicular to said first face, said inverted trough having a width; and a cylindrical pin having a longitudinal axis, a circumferential face, and an axial tip, said pin at least partially disposed in said housing with said circumferential face being adjacent to said second open end of said linear tunnel with said axial tip disposed parallel to said first face of said housing, wherein a volumetric region lies between said inverted trough and said circumferential face of said pin, and said pin being operable to be rotated about said longitudinal axis wherein, when said pin is rotated and the material exits said second open end, the material exiting said second open end is plasticized in said volumetric region, and wherein the material so-plasticized exits said inverted trough at said shaped opening as the material is fed through said linear tunnel.

9. The additive manufacturing system of claim 8, wherein said linear tunnel is perpendicular to said longitudinal axis of said pin.

10. The additive manufacturing system of claim 8, further comprising guides coupled to said first face of said housing at opposing sides of said inverted trough, said guides adapted to receive and seal against opposing sides of an edge region of a substrate, wherein the edge region is disposed in said inverted trough in opposition to said axial tip of said pin wherein the edge region is plasticized as said pin is rotated, and wherein the material so-plasticized mixes with the edge region so-plasticized as the material is fed through said passageway.

11. The additive manufacturing system of claim 8, wherein a cross-sectional area of said second open end is larger than a cross-sectional area of said first open end.

12. The additive manufacturing system of claim 8, wherein said shaped opening matches a cross-sectional shape of said inverted trough.

13. A method of additive manufacturing, comprising:
by a housing configured to include a passageway extending through a portion of the housing and having a first open end at an exterior of the housing and a second open end at an interior of the housing, the housing further configured to include an inverted trough open along a first face of the housing and having a side adjacent to and in fluid communication with the second open end with the inverted trough extending to a shaped opening at a second face of the housing that is perpendicular to the first face, and a pin having a longitudinal axis, a circumferential face, and an axial tip with the pin at least partially disposed in the housing with the circumferential face being adjacent to the second open end of the passageway and with the axial tip disposed parallel to the first face of said housing wherein a volumetric region lies between the inverted trough and the circumferential face of the pin, positioning the housing adjacent to a substrate wherein the first face of the housing opposes a face of the substrate;

rotating the pin about the longitudinal axis of the pin;

feeding a material through the passageway from the first open end during the step of rotating, wherein the material exits the second open end and is plasticized in the volumetric region; and generating relative movement between the housing and the substrate during the steps of rotating and feeding, wherein the material so-plasticized in the volumetric region exits the inverted trough at the shaped opening and is deposited on the face of the substrate as the material is fed through the passageway.

14. The additive manufacturing method of claim 13, wherein the passageway is linear.

15. The additive manufacturing method of claim 13, wherein the passageway is linear and is perpendicular to the longitudinal axis of the pin.

16. The additive manufacturing method of claim 13, wherein a cross-sectional area of the second open end is larger than a cross-sectional area of the first open end.

17. The additive manufacturing method of claim 13, wherein the housing further includes guides coupled to the first face of the housing at opposing sides of the inverted trough, the method further comprising:
- positioning an edge region of the substrate between the guides and in sealing contact with the guides, wherein the edge region is disposed in the inverted trough in opposition to the axial tip of the pin wherein the edge region is plasticized during the step of rotating,
- wherein the material so-plasticized mixes with the edge region so-plasticized during the step of feeding, and
- wherein a mixture of the material so-plasticized and the edge region so-plasticized exits the inverted trough for deposition onto the edge region during the steps of rotating, feeding, and generating.

18. The additive manufacturing method of claim 13, wherein a cross-section of the second open end is encompassed by the side of the inverted trough in fluid communication with the second open end.

19. The additive manufacturing method of claim 13, wherein said shaped opening matches a cross-sectional shape of said inverted trough.

* * * * *